United States Patent [19]

Hasha et al.

[11] 4,407,171

[45] Oct. 4, 1983

[54] APPARATUS AND METHOD FOR HYDROSTATICALLY TESTING SEALING FACE SURFACES OF TUBULAR JOINTS

[76] Inventors: Malvern M. Hasha, 11002 Twain Dr., Montgomery, Tex. 77356; Brian B. Hasha, 17211 Ash Butte, Houston, Tex. 77090

[21] Appl. No.: 282,088

[22] Filed: Jul. 10, 1981

[51] Int. Cl.³ ............................................. G01M 3/08
[52] U.S. Cl. ........................................ 73/46; 73/49.1; 73/49.5; 73/49.8
[58] Field of Search ................. 73/46, 49.1, 49.5, 49.8

[56] References Cited

U.S. PATENT DOCUMENTS

| | | |
|---|---|---|
| 1,647,121 | 11/1927 | Beall . |
| 2,062,527 | 12/1936 | Postlewaite . |
| 2,526,172 | 10/1950 | Sunde . |
| 2,695,632 | 11/1954 | Brock . |
| 2,873,764 | 2/1959 | Lombard et al. ................. 73/49.5 |
| 3,213,673 | 10/1965 | Schulhoff, Sr. . |
| 3,371,521 | 3/1968 | Hauk . |
| 3,653,254 | 4/1972 | Semon . |
| 3,673,858 | 7/1972 | Miller ................................ 73/49.1 |
| 4,192,177 | 3/1980 | Crickard et al. ................. 73/49.1 |
| 4,197,733 | 4/1980 | Holland ............................ 73/49.1 |

*Primary Examiner*—Howard A. Birmiel
*Attorney, Agent, or Firm*—Vinson & Elkins

[57] ABSTRACT

An apparatus and method for hydrostatically testing the seal integrity against leakage of the sealing face surface of the end of a pipe is disclosed. A test pad is engaged against a sealing face surface of a pipe and urged into tight contact with said sealing face surface. Fluid is applied under pressure to the juncture between said test pad and said sealing face surface to determine the seal integrity against leakage of the sealing face surface.

40 Claims, 9 Drawing Figures

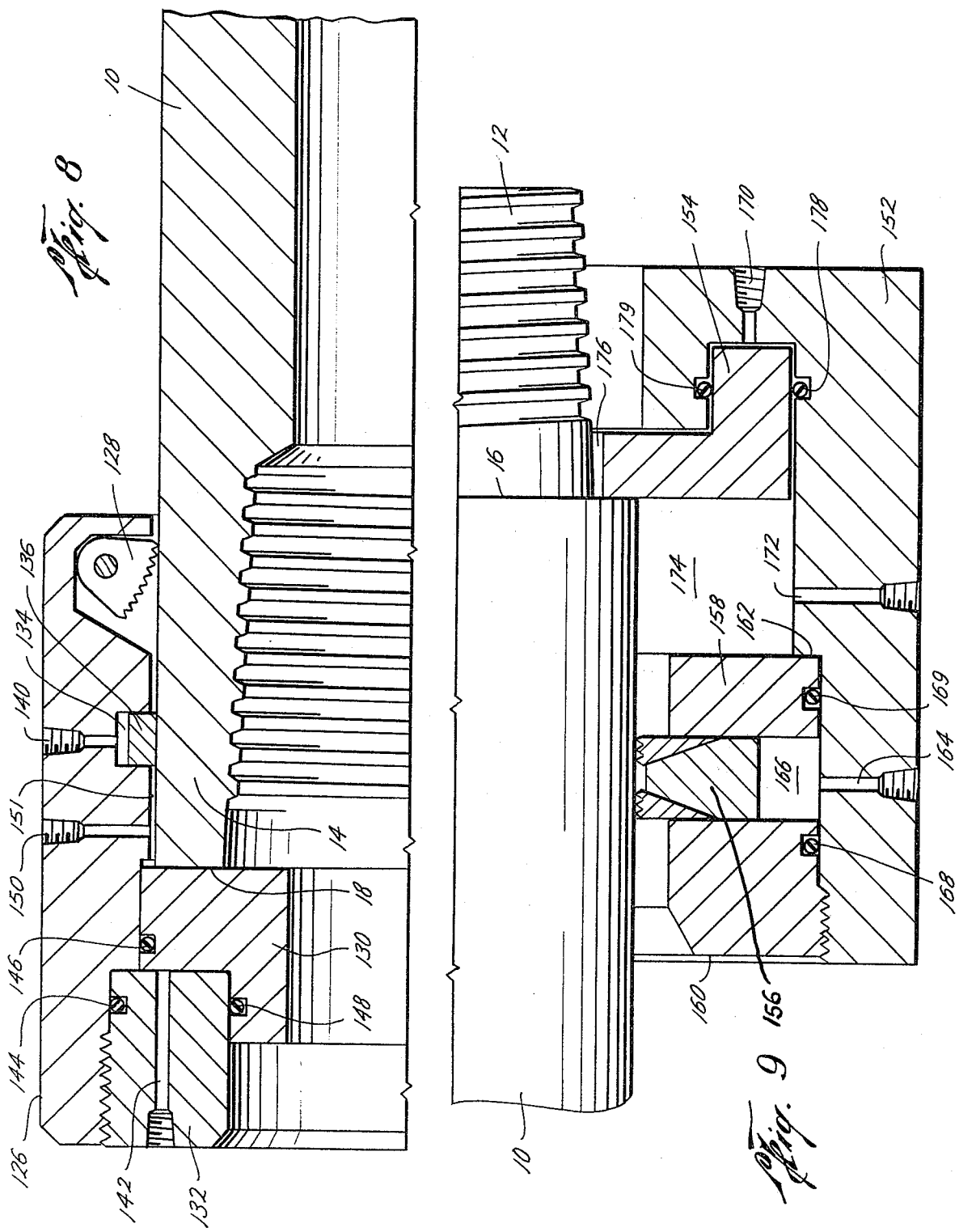

APPARATUS AND METHOD FOR HYDROSTATICALLY TESTING SEALING FACE SURFACES OF TUBULAR JOINTS

This invention relates to the hydrostatic testing of the integrity of the connection between two sections of pipe that have been coupled together to form a pipe joint.

BACKGROUND OF THE INVENTION

Hydrostatic testing of pipe used in the oil and gas producing industry is generally accomplished by sealing a section of pipe at both ends and by injecting test fluid under pressure into the pipe through one of the seals. Cracks or irregularities in the pipe may be detected by observing leakage of the test fluid. The present invention hydrostatically tests the surfaces of pipe that abut each other in a pipe joint in order to determine the seal integrity of said surfaces against leakage.

Typically, each section of pipe possesses a threaded male end and a threaded female end so that the sections of pipe may be threaded together to make a string of pipe. The cylindrically symmetrical extreme end of the female end of each pipe is designed to firmly seat against the cylindrically symmetrical shoulder at the base of the threaded portion of each male end of each pipe. When the pipes are threaded together, the threaded portions of each pipe are not visible to anyone observing either the interior or the exterior surface of the pipe joint because the threadably engaged portions of each section of pipe are contained within the pipe wall.

The surface of the shoulder of the male end of a first pipe and the surface of the extreme end of the female end of a second pipe each comprise a sealing face surface on the respective ends of each pipe. These two sealing face surfaces meet at the point of juncture between the external surface of the male end of said first pipe and the external surface of the female end of said second pipe when a pipe joint is made up. When the sealing face surfaces of the adjoining male and female ends of said first and second pipes firmly abut each other, they prevent the escape of fluid from the interior of the pipe joint. That is, if fluid in the pipe leaks through the threaded portion of the pipe joint to the juncture of the sealing face surfaces in the pipe joint, then the fluid cannot flow through the juncture if the sealing face surfaces of the pipes forming the pipe joint are flat, smooth and undamaged.

Although various hydrostatic testing devices exist to detect leakage of test fluid past the threaded connection of a male end and a female end of threaded pipe, these devices detect leakage from the pipe joint as a whole. That is, such devices do not permit one to test the seal integrity of the sealing face surfaces separate and apart from testing the seal integrity of the engaged threaded portions of the male and female ends of threaded pipe.

OBJECTS OF THE INVENTION

An object of the invention is to provide a hydrostatic pipe testing apparatus and method for testing the seal integrity against leakage of the sealing face surface of the end of a pipe.

Another object of the invention is to provide means for engaging a test pad against a sealing face surface of a pipe, means for effecting tight contact at the juncture between said test pad and said sealing face surface and means for applying fluid under pressure to said juncture to determine the seal integrity against leakage of said sealing face surface.

Another object of the invention is to provide an easily maneuverable and portable apparatus for testing the seal integrity against leakage of the sealing face surface of the end of a pipe.

BRIEF DESCRIPTION OF THE DRAWINGS

With these objects in mind and others which will become manifest as the description proceeds, reference is to be had to the accompanying drawings in which like reference characters designate like parts in the several views thereof, in which:

FIG. 8 is a longitudinal cross-sectional view of an alternate form of the invention externally engaged onto the female end of a pipe showing means for securing the invention to the exterior surface of said pipe; and FIG. 9 is a longitudinal cross-sectional view of an alternate form of the invention externally engaged onto the male end of a pipe showing means for securing the invention to the exterior surface of said pipe.

DESCRIPTION OF THE PREFERRED EMBODIMENT

Figure 5:
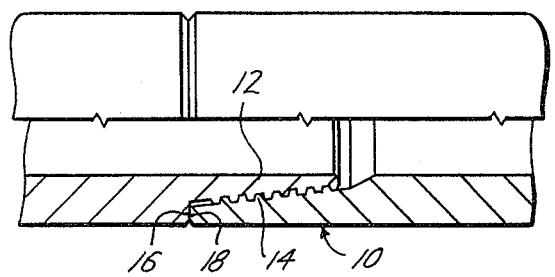
FIG. 5 is a longitudinal cross-sectional view of a pipe joint.

With more detailed reference to the drawings, the numeral 10 designates generally the pipe being tested. As shown in FIG. 5, the sealing face surface 16 of the male end 12 of a pipe abuts the sealing face surface 18 of the female end 14 of a pipe when the male end 12 and the female end 14 of the pipes are made up into a pipe joint.

Figure 1:
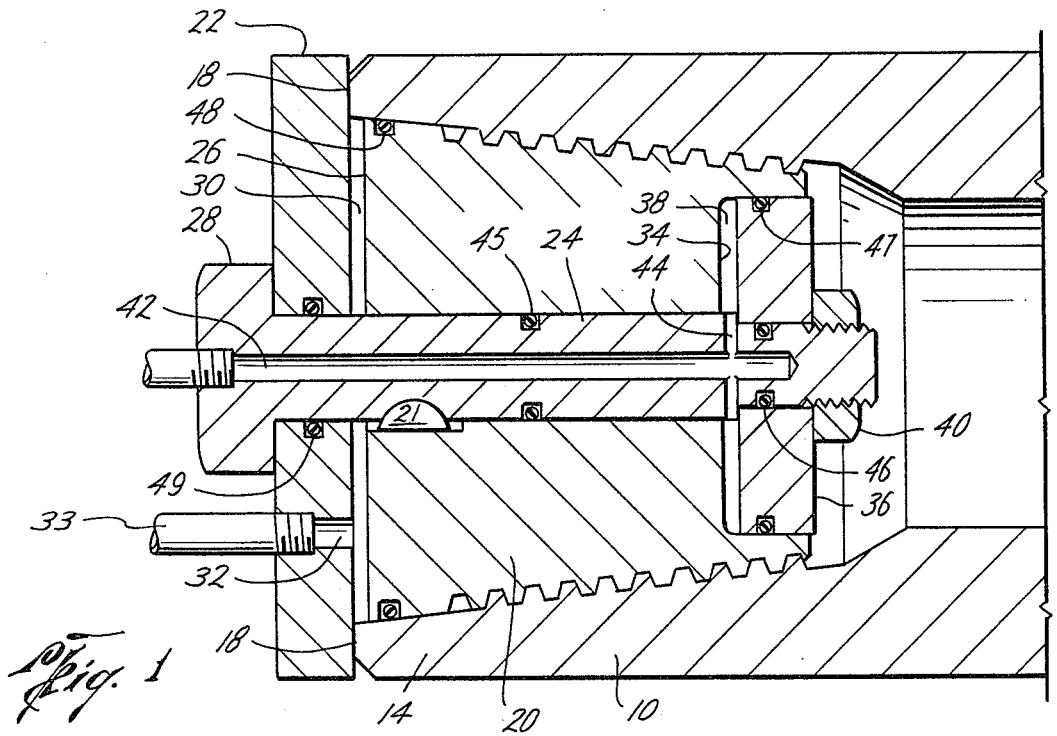
FIG. 1 is a longitudinal cross-sectional view of the invention threadably engaged into the female end of a threaded pipe.

The preferred embodiment of the apparatus for testing the female end of the pipe is shown in FIG. 1 and generally comprises a threaded manifold 20 and test pad 22 coupled by a rod 24 slidably disposed within axial passageways through said threaded manifold 20 and test pad 22. Threaded manifold 20 is a cylindrically symmetrical threaded manifold having the same external dimensions and threading as the male end 12 of a threaded pipe. The axial length of said threaded manifold 20 is such that when said threaded manifold 20 is fully threaded into the female end 14 of the pipe 10 the outer surface 26 of the threaded manifold 20 is within the female end 14 of the pipe. The rod 24 has a cross-sectional area slightly smaller than the cross-sectional area of the axial passageway through said threaded manifold 20 thereby causing rod 24 to be slidably disposed at close tolerance within said axial passageway of said threaded manifold 20. A Woodruff key assembly 21 may be placed between threaded manifold 20 and rod 24 as shown in FIG. 1 to facilitate the installation and removal of threaded manifold 20 with respect to the pipe 10.

The test pad 22 has a surface area sufficiently large to cover the cross-sectional area of the pipe 10 when test pad 22 is seated against the female sealing face surface 18 of the female end 14 of the pipe (FIG. 1). Said test pad 22 also has an axial passageway therethrough, said axial passageway having the same dimensions as that of the axial passageway through the threaded manifold 20 so that said rod 24 may be simultaneously slidably disposed at close tolerance within both the test pad 22 and the threaded manifold 20. The end of rod 24 terminates in a flange 28 for retaining test pad 22 on rod 24 and for urging test pad 22 against the sealing face surface 18 of the female end 14 of the pipe when said rod 24 is biased with respect to said threaded manifold 20.

When said rod 24 is moved inwardly with respect to threaded manifold 20 flange 28 presses test pad 22 against the sealing face surface 18. Because the outer surface 26 of the threaded manifold is within the pipe 10 when threaded manifold 20 is fully threaded within the female end 14 of the pipe, a cavity 30 is formed by the outer surface 26 of the threaded manifold 20, the interior surface of test pad 22, an external surface of rod 24 and the interior wall of the female end 14 of the pipe. As can be seen by referring to FIG. 1, any fluid contained within said cavity 30 would have fluid communication with the juncture between test pad 22 and sealing face surface 18. An inlet 32 through test pad 22 permits the introduction and withdrawal of test fluid to and from cavity 30 through a suitable conduit 33.

Turning now to the means by which rod 24 is biased with respect to threaded manifold 20, FIG. 1 shows that said manifold 20 has a cylindrically symmetrical recessed area 34 in that portion of threaded manifold 20 which extends most inwardly into pipe 10 when said manifold 20 is threadably secured within the female end 14 of said pipe. A piston 36 snugly fits into the recessed area 34 to form a chamber 38 between the surface of the said area 34 of manifold 20 and the immediately adjacent interior surface of piston 36. Piston 36 has an axial passageway therethrough having a cross-sectional area slightly larger than the cross-sectional area of the end of rod 24 that extends through threaded manifold 20 so that said piston 36 may be disposed at close tolerance on said rod 24. A retaining nut 40 retains piston 36 on rod 24.

An axial passageway 42 extends through flange 28 and through a portion of the body of rod 24 to a point in the body of rod 24 near the recessed area 34 of threaded manifold 20. Radial ports 44 connect axial passageway 42 with chamber 38 when rod 24 is slidably disposed within threaded manifold 20. Fluid introduced into axial passageway 42 may flow through radial ports 44 into chamber 38. O-rings 45 and 46 in rod 42 and O-ring 47 in piston 36 prevent the escape of fluid from chamber 38.

In operation, the manifold 20 is completely threaded into the female end 14 of pipe 10 as shown in FIG. 1. Fluid is introduced into axial passageway 42 of rod 24 and fills chamber 38. Increasing the pressure on the fluid in axial passageway 42 causes the pressure to be transmitted to the fluid in chamber 38 and causes piston 36 to move outwardly with respect to threaded manifold 20. Piston 36 presses against retaining nut 40 thereby causing rod 24 to move inwardly with respect to threaded manifold 20. Flange 28 transmits the force of the hydraulic pressure acting on rod 24 to test pad 22, thereby causing test pad 22 to press against sealing face surface 18.

Thereafter test fluid is introduced through conduit 33 and inlet 32 into cavity 30. O-ring 48 in an annular groove formed in the exterior of the body of threaded manifold 20 and O-rings 45 and 49 disposed in grooves in the outer surface of rod 24 prevent the escape of test fluid from cavity 30. Because the surface of test pad 22 that seats against sealing face surface 18 is machined to be smooth, the test fluid introduced into cavity 30 will not leak through the juncture between sealing face surface 18 and test pad 22 if the sealing face surface 18 is in fact smooth. Increasing the pressure on the test fluid in cavity 30 will cause test fluid to leak through the juncture between sealing face surface 18 and test pad 22 if surface irregularities exist in sealing face surface 18. A visual inspection or the use of a precision pressure gauge to inspect the juncture between sealing face surface 18 and test pad 22 on the outside of pipe 10 will reveal whether sealing face surface 18 possesses sufficient seal integrity to prevent leakage when the female end 14 of the pipe 10 is threadably connected to a male end 12 of a pipe that possesses a sealing face surface 16 with no surface irregularities.

If the surface of test pad 22 that seats against sealing face surface 18 should become damaged or worn so that it is no longer smooth, it is a simple matter to remove retaining nut 40, withdraw rod 24 from threaded manifold 20, remove the damaged or worn test pad 22 and replace it with a new test pad 22.

Test pad 22 must seat flatly against sealing face surface 18. Therefore, the cumulative tolerance range of the machined surfaces of test pad 22, rod 24, threaded manifold 20, piston 36, etc. must not be greater than the pipe manufacturer's permitted tolerance range for sealing face surface 18 in order that test pad 22 does not seat upon sealing face surface 18 at an angle. If sealing face surface 18 exceeds the pipe manufacturer's permitted tolerance range and is thus "out of square" or if the test pad 22 exceeds the permitted tolerance range and is thus "wobbly" with respect to sealing face surface 18, then test fluid may escape from cavity 30 even if no surface irregularities exist in sealing face surface 18.

Figure 2:
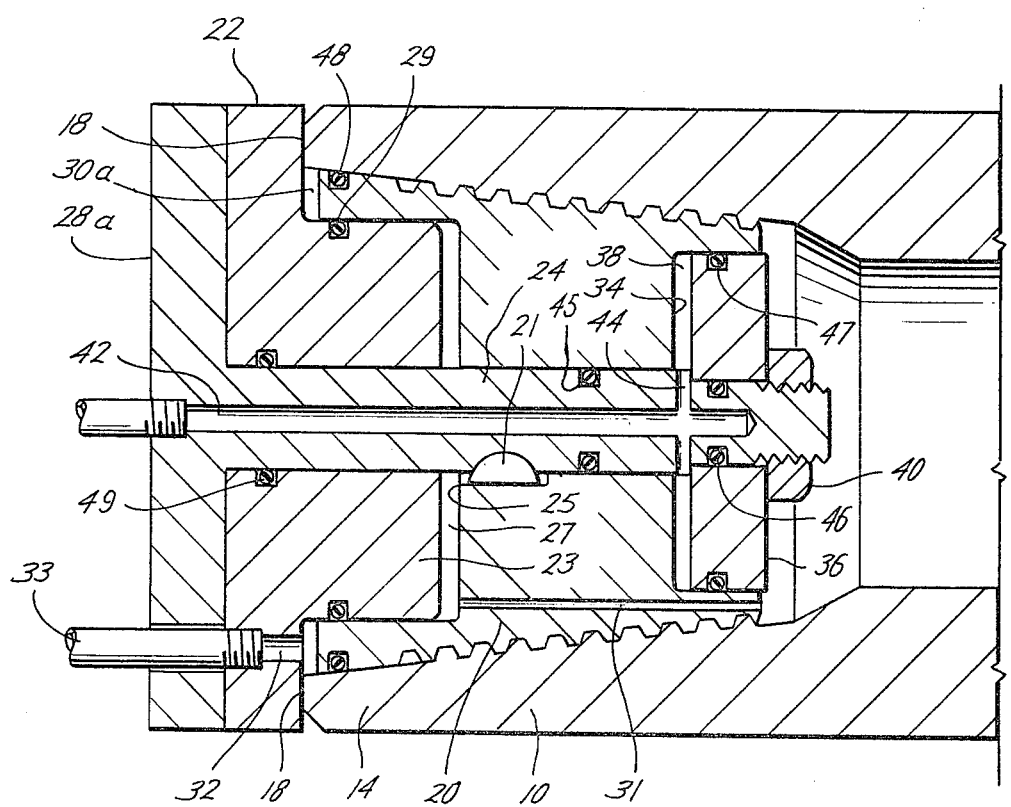
FIG. 2 is a longitudinal cross-sectional view of an alternate form of the invention threadably engaged into the female end of a threaded pipe.

FIG. 2 depicts an alternate form of the invention in which an interior portion of the body of test pad 22 extends inwardly with respect to pipe 10 to form a test pad plug 23. A chamber 25 cut from the rear surface 26 of threaded manifold 20 possesses a shape which is complementary to the shape of test pad plug 23 so that test pad plug 23 is disposed at close tolerance within chamber 25 of threaded manifold 20 when test pad 22 abuts sealing face surface 18. A cavity 27 is formed between the surface of test pad plug 23 and the walls of chamber 25 when test pad plug 23 is disposed within chamber 25.

The objective accomplished by this particular embodiment of the invention is the minimization of the force which might tend to urge test pad 22 outwardly from the sealing face surface 18 in the structure shown in FIG. 1. In that structure, the force exerted by the test fluid within cavity 30 tends to counteract the force acting against piston 36 which is urging the pad into contact with the sealing face surface 18. The use of the test pad plug 23 reduces this counteracting force because the force exerted equals the pressure times the surface area over which the pressure acts; the test pad plug 23 reduces the surface area of cavity 30 thereby reducing the force that the test fluid can exert for a given pressure.

In operation, the introduction of test fluid into reduced size cavity 30a is similar to the method previously described. In this particular embodiment, however, inlet 32 and conduit 33 must be located nearer to the edge of test pad 22 in order to permit fluid communication with reduced size cavity 30a. In addition, O-ring 29 must be present in test pad plug 23 to prevent the test fluid from reaching cavity 27. Cavity 27 may be vented to the interior of pipe 10 via ventilation duct 31 in order to maintain atmospheric pressure in cavity 27. This particular embodiment of the invention finds useful application when the test fluid is subjected to high test pressures.

In such instances, it may also be desirable to extend the area of flange 28 to form a flange 28a which completely covers the outer surface of test pad 22 as shown in FIG. 2 in order to more evenly spread the retaining force over test pad 22. The enlarged flange 28a facilitates the use of high pressure to retain test pad 22 against sealing face surface 18. Of course, enlarged flange 28a must have a passageway through it to accommodate conduit 33 as shown in FIG. 2.

Figure 3:
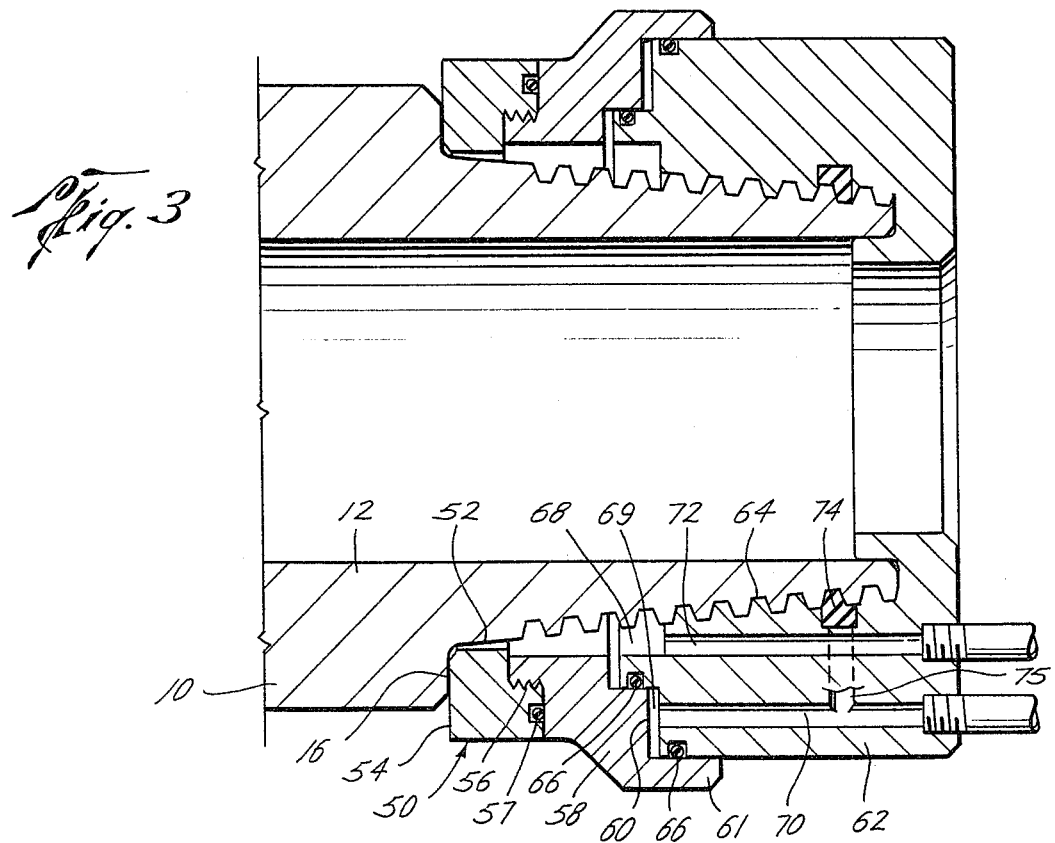
FIG. 3 is a longitudinal cross-sectional view of the invention threadably engaged onto the male end of a threaded pipe.

Turning now to the preferred embodiment of the invention for hydrostatically testing the sealing face surface 16 of the male end 12 of a pipe, FIG. 3 shows that the test pad 50 which seats against the sealing face surface 16 is in the form of an annulus surrounding that portion 52 of the male end 12 of the pipe 10 immediately adjacent to the sealing face surface 16 of said pipe. As shown in FIG. 3, the inner radius of test pad 50 is slightly greater than the outer radius of that portion 52 of the male end 12 of the pipe 10 immediately adjacent to the sealing face surface 16 of said pipe. This feature allows test fluid to communicate with the juncture between sealing face surface 16 and test pad 50. Test pad 50 has a flat surface 54 for seating against sealing face surface 16. The flat surface 54 of test pad 50 is machined to be smooth. When sufficient pressure is applied urging test pad 50 against sealing face surface 16, test fluid will not leak through the juncture between sealing face surface 16 and test pad 50 if the sealing face surface 16 is smooth.

In the preferred embodiment of the invention, test pad 50 has a threaded top portion 56 for engaging a cylindrically symmetrical pressure collar 58. Test pad 50 may be threadably removed from pressure collar 58 and replaced with a new test pad when the flat surface 54 of test pad 50 becomes worn or damaged with use. O-ring 57 prevents the flow of test fluid through the juncture between test pad 50 and pressure collar 58 when test pad 50 and pressure collar 58 are threadably engaged.

As shown in FIG. 3, the top portion of pressure collar 58 has a cylindrically symmetrical shoulder 60 and cylindrical wall 61 for receiving the lower portion of cylindrically symmetrical threaded manifold 62. Said threaded manifold 62 possesses a threaded surface 64 which threadably engages the male end 12 of pipe 10 in the same fashion as would the female end of a threaded pipe. Although the threaded surface 64 of threaded manifold 62 may be designed to engage the male end 12 of the pipe 10 being tested over the total length of the threaded section of the male end 12 of the pipe 10 being tested, the threaded surface 64 of threaded manifold 62 of the preferred embodiment of the invention engages the male end 12 of the pipe 10 being tested over a length that is shorter than the total length of the threaded section of the male end 12 of the pipe 10 being tested.

When said threaded manifold 62 is threaded onto the male end 12 of the pipe 10, the section of the male end 12 of the pipe 10 not threadably engaged by threaded manifold 62 forms the inner wall of an annular space 68 formed between said threaded manifold 62, pressure collar 58, test pad 50 and the male end 12 of the pipe 10. If several pipes, each having a different length threaded section, are to be tested, pressure collars 58 of differing lengths corresponding to the various lengths of the threaded sections may be used in connection with a single threaded manifold 62 and a single test pad 50.

As shown in FIG. 3, the length of a pressure collar 58 is chosen so that when said threaded manifold 62 is completely threaded onto the male end 12 of the pipe 10, said threaded manifold 62 does not firmly seat against said pressure collar 58 when said pressure collar 58 is threaded onto test pad 50 and test pad 50 abuts sealing face surface 16. The proximity of the bottom portion of said threaded manifold 62 with respect to pressure collar 58 causes an annular cavity 69 to be formed by the surfaces of the cylindrically symmetrical shoulder 60 and the cylindrically symmetrical wall 61 of pressure collar 58 and the surfaces of the lower portion of the cylindrically symmetrical threaded manifold 62. As will be more fully described, the introduction of fluid into annular cavity 69 forces test pad 50 into tight contact with sealing face surface 16 of the pipe 10.

In operation, pressure collar 58 is threaded onto test pad 50 and the combination is lowered around the male end 12 of the pipe 10 to be tested until the bottom portion 54 of test pad 50 rests against the sealing face surface 16 of the pipe 10. Then threaded manifold 62 is completely threaded onto the male end 12 of pipe 10 thereby forming annular cavity 69.

In an alternative embodiment of the invention, the outer diameter of the threaded manifold 62 may be chosen to be so close in value to the inner diameter of the cylindrically symmetrical wall 61 of pressure collar 58 that the frictional forces between said manifold 62 and cylindrically symmetrical wall 61 prevent the combination of the test pad 50 and the pressure collar 58 from falling away from the bottom portion of manifold 62 after said combination is fitted onto the bottom of said manifold. In that case, the combination of test pad 50 and pressure collar 58 fitted upon the end of manifold 62 rotates with the manifold while the manifold is being threaded onto the male end 12 of the pipe 10.

A first duct 70 extends from the top of threaded manifold 62 to the annular cavity 69. O-rings 66 within said manifold 62 on either side of said annular cavity 69 prevent fluid introduced into said first duct 70 from escaping from annular cavity 69 through the interface between threaded manifold 62 and pressure collar 58. When hydraulic pressure is applied to said fluid in said first duct 70 and annular cavity 69, the pressure of such fluid forces pressure collar 58 and test pad 50 against sealing face surface 16 of pipe 10, thereby firmly seating said test pad 50 against said sealing face surface 16.

Test fluid is then introduced into annular space 68 through a second duct 72 leading from the top of threaded manifold 62 to annular space 68. An annular seal ring 74 of elastic material prevents the escape of test fluid through the juncture between threaded manifold 62 and the male end 12 of pipe 10. As shown in FIG. 3, annular seal ring 74 may be firmly urged against threaded manifold 62 by the pressure of the fluid introduced into first duct 70. Said fluid may communicate with the outer edge of annular seal ring 74 via a third duct 75 (shown in dotted outline in FIG. 3) leading from first duct 70 to annular seal ring 74. O-rings 66 prevent the test fluid in annular space 68 from escaping through the juncture between pressure collar 58 and threaded manifold 62. O-ring 57 prevents the test fluid in annular space 68 from escaping through the juncture between pressure collar 58 and test pad 50. Test fluid under pressure in annular space 68 will escape through the juncture between sealing face surface 16 and test pad 50 if surface irregularities exist in sealing face surface 16. A visual inspection or the use of a precision pressure gauge to inspect the juncture between sealing face surface 16 and test pad 50 on the outside of pipe 10 will reveal whether sealing face surface 16 possesses sufficient seal integrity to prevent leakage when the male end 12 of the pipe 10 is threaded onto a female end 14 of a pipe that possesses a sealing face surface 18 with no surface irregularities.

Test pad 50 must seat flatly against sealing face surface 16. Therefore, the cumulative tolerance range of the machined surfaces of test pad 50, pressure collar 58, threaded manifold 62, etc. must not be greater than the pipe manufacturer's permitted tolerance range for sealing face surface 16 in order that test pad 50 does not seat upon sealing face surface 16 at an angle. If sealing face surface 16 exceeds the pipe manufacturer's permitted tolerance range and is thus "out of square" or if test pad 50 exceeds the permitted tolerance range and is thus "wobbly" with respect to sealing face surface 16, then test fluid may escape from annular space 68 even if no surface irregularities exist in sealing face surface 16.

Figure 4:
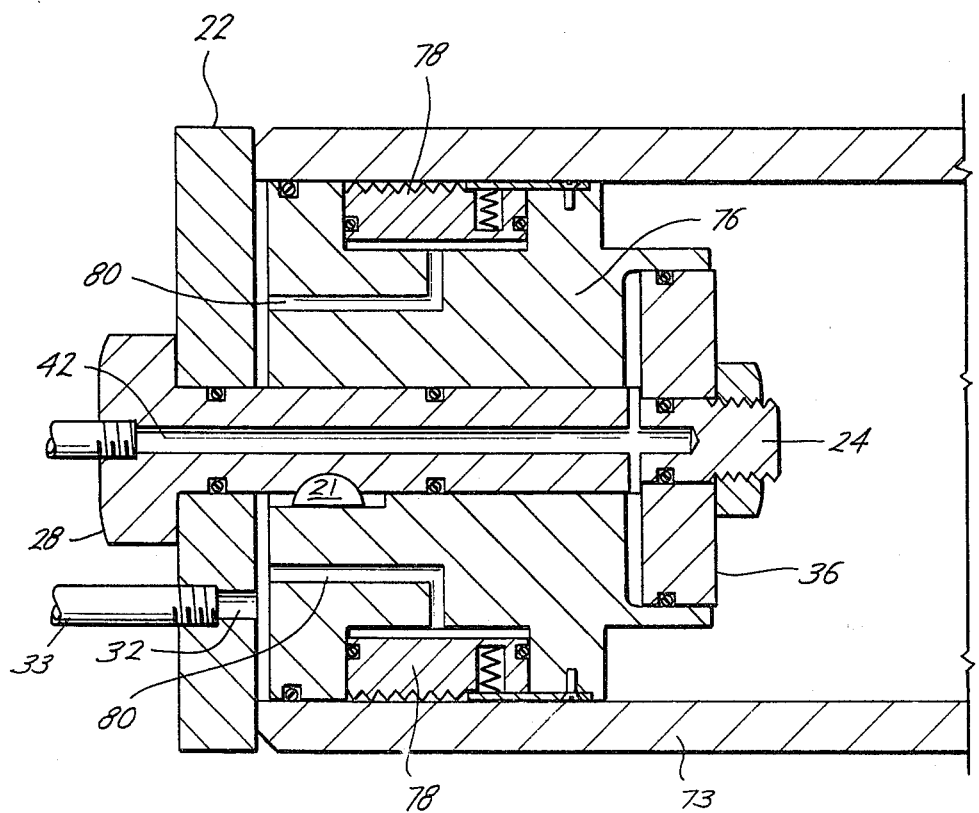
FIG. 4 is a longitudinal cross-sectional view of the invention anchored within a non-threaded pipe.

The invention may be embodied in an apparatus for testing the sealing face surfaces of non-threaded pipe. FIG. 4 shows how the invention as shown in FIG. 1 can be anchored within the end of a non-threaded pipe. A non-threaded manifold 76 is substituted for threaded manifold 20. Said non-threaded manifold 76 may be anchored by any well known anchoring means such as anchoring slips 78 controlled by any of a number of anchoring slip control mechanisms 80 (depicted diagrammatically in FIG. 4). Once the manifold 76 is anchored the invention is operated in the same manner as that previously described for the female end 14 of threaded pipe.

Figure 6:
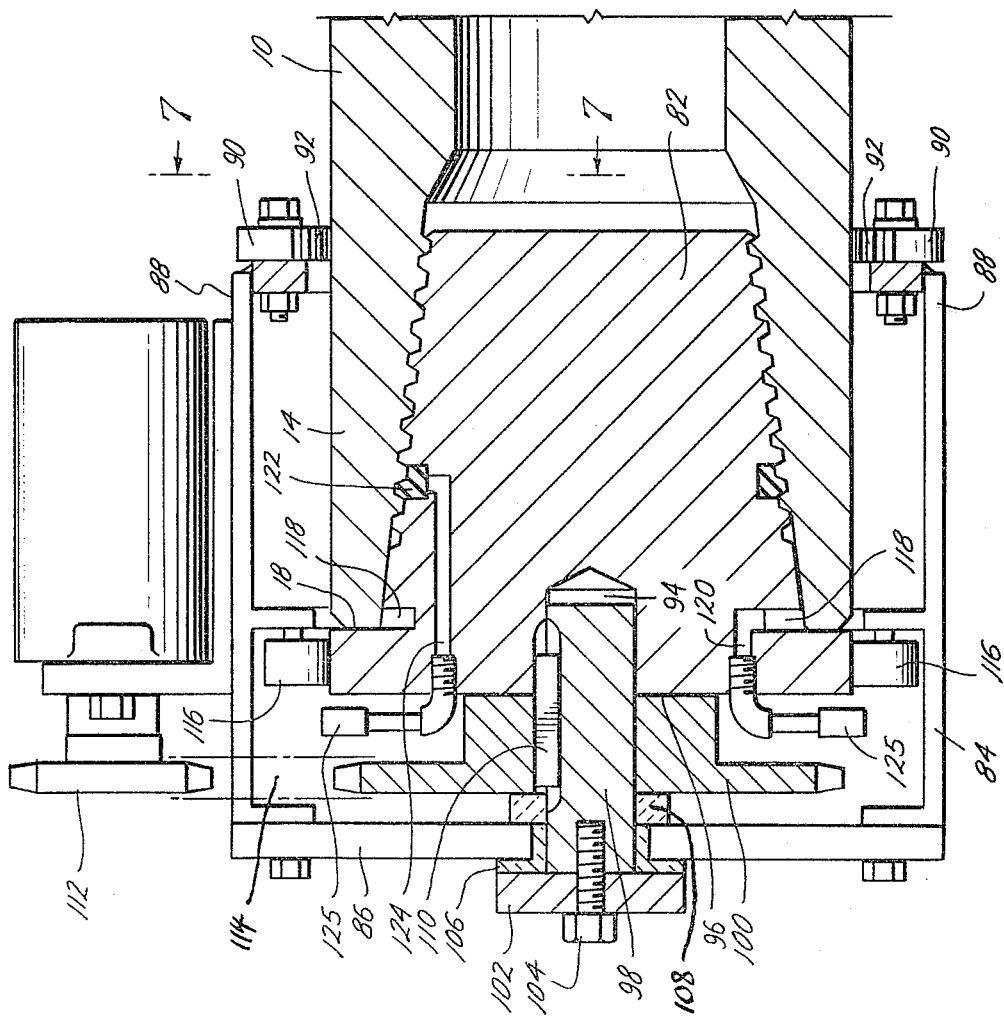
FIG. 6 is a longitudinal cross-sectional view of an alternate form of the invention threadably engaged into the female end of a threaded pipe showing a rotatable chain-driven sprocket mounted within a rotatable frame having arms with pivotally mounted tongs for gripping the pipe.

FIG. 6 shows an alternate embodiment of the invention for hydrostatically testing the sealing face surface 18 of the female end 14 of a pipe. In this embodiment of the invention, the previously described threaded manifold 20 and test pad 22 are formed in one piece as shown in FIG. 6. The threaded manifold of this embodiment of this invention will be denoted by the numeral 82.

The cylindrically symmetrical threaded manifold 82 is rotatably mounted within a tong frame 84 as will be more fully described below. Tong frame 84 generally comprises a cylindrically symmetrical tong frame base 86 and a plurality of tong frame arms 88 disposed around the periphery of tong frame base 86 for slidably receiving the female end 14 of pipe 10 to be tested.

Figure 7:
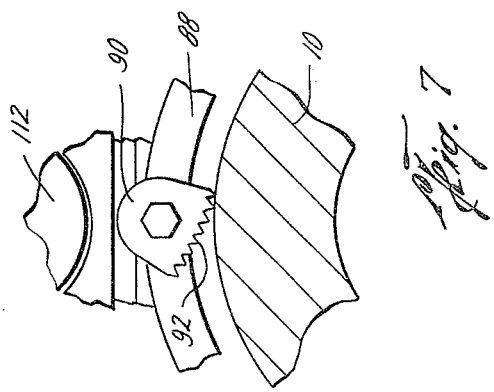
FIG. 7 is a schematic plan view taken along the line 7—7 of FIG. 6 showing the camming action of an individual pivotally mounted tong.

A tong 90 is pivotally mounted on the end of each tong frame arm 88 as shown in FIGS. 6 and 7. When tong frame 84 is rotated with respect to pipe 10, the tong gripping surfaces 92 of each tong 90 are cammed into gripping engagement with the external surface of pipe 10 as shown in FIG. 7.

Turning now to a description of the means by which threaded manifold 82 is rotatably mounted within tong frame 84, one may refer to FIG. 6 to see that threaded manifold 82 is formed having portions defining an axial passageway 94 extending from the outer surface 96 of threaded manifold 82 into the body of threaded manifold 82. A rod 98 having a cross-sectional area slightly smaller than the cross-sectional area of the axial passageway 94 through said threaded manifold 82 is slidably disposed at close tolerance within said axial passageway 94 of said threaded manifold 82.

This embodiment of the invention employs a sprocket 100 used for imparting rotational force to threaded manifold 82 to rotatably engage or disengage said threaded manifold 82 from the threads of the female end 14 of pipe 10. Said sprocket 100 also has an axial passageway therethrough, said axial passageway having the same dimensions as that of the axial passageway 94 through threaded manifold 82 so that said rod 98 may be simultaneously slidably disposed at close tolerance within both the sprocket 100 and the threaded manifold 82. A flange 102 is affixed to the end of rod 98 by a bolt 104. Flange 102 prevents rod 98 from slidably moving forward with respect to tong frame base 86.

As shown in FIG. 6, a first bushing 106 separates tong frame base 86 on the one hand and flange 102 and rod 98 on the other hand. As also shown in FIG. 6, a second bushing 108 separates tong frame base 86 and sprocket 100. Both first bushing 106 and second bushing 108 are cylindrically symmetrical and have an axial passageway therethrough for slidably receiving rod 98. This permits rod 98 and attached flange 102 to freely rotate with respect to tong frame base 86. A key 110 is disposed within a slot formed in the surfaces of rod 98, sprocket 100 and threaded manifold 82. When motor 112 imparts rotational force to chain 114 (shown in dotted outline), said chain 114 causes sprocket 100 to turn. Said key 110 causes the rotational force imparted to sprocket 100 to be transmitted to threaded manifold 82. The described structure permits the rotational engaging or disengaging of threaded manifold 82 with respect to the female end 14 of pipe 10 when sprocket 100 is rotated clockwise or counterclockwise. A plurality of rollers 116 as shown in FIG. 6 supports and centers the outer portions of threaded manifold 82 which correspond in function to the test pad 22 previously described.

In operation, the female end 14 of pipe 10 is inserted into tong frame 84 (FIG. 6). The rotation imparted to sprocket 100 via motor 112 and chain 114 is transmitted to threaded manifold 82 through key 110 and rod 98. Threaded manifold 82 is thus rotated into threaded engagement with the threads of the female end 14 of pipe 10. As shown in FIG. 6, threaded manifold 82 has portions defining a cavity 118 within threaded manifold 82 at the juncture of sealing face surface 18 and threaded manifold 82. Test fluid may be introduced into cavity 118 through a conduit 120 leading from the top of threaded manifold 82 to cavity 118. An annular seal ring 122 of elastic material prevents the escape of test fluid through the juncture between threaded manifold 82 and the female end 14 of pipe 10. Annular seal ring 122 may be firmly urged against the female end 14 of pipe 10 by the pressure of fluid introduced into a conduit 124 leading from the top of threaded manifold 82 to an interior surface of annular seal ring 122.

The hydraulic lines leading to conduits 120 and 124 are disconnected and sealed with quick disconnect valves 125 during the rotation of threaded plug 82 into the threads of the female end 14 of pipe 10. After the hydraulic lines leading to conduits 120 and 124 have been reconnected through quick disconnect valves 125, fluid is then introduced into conduit 124 to cause annular seal ring 122 to seal the juncture between threaded manifold 82 and the female end 14 of pipe 10. Next, fluid is introduced under pressure through conduit 120 to cavity 118. As previously described, any surface irregularities in the sealing face surface 18 of the female end 14 of pipe 10, will be detected if test fluid is seen to be leaking from cavity 118. Following the completion of the testing process, tongs 90 and tong frame 84 may be disengaged from the pipe 10 and threaded manifold 82 may be unthreaded from pipe 10 by reversing the direction of rotation of sprocket 100 by reversing the direction of rotation of motor 112.

Still another embodiment of the invention having means for gripping the external surface of a pipe 10 being tested is shown in FIG. 8. A cylindrically symmetrical manifold 126 possesses an inner diameter only slightly larger than the outer diameter of the female end 14 of the pipe 10 being tested. Said end 14 of pipe 10 may be slidably disposed within said manifold 126 at close tolerance. Pipe 10 is slidably moved into position within manifold 126 until sealing face surface 18 abuts test pad 130 as shown in FIG. 8. Test pad 130 is held in place with respect to manifold 126 by a threaded nut 132 threadably engaged within manifold 126.

After manifold 126 has been moved into position with respect to pipe 10 so that test pad 130 abuts sealing face surface 18, then pivotally mounted gripping cams 128 are moved into gripping position to grip the external surface of pipe 10.

As shown in FIG. 8, manifold 126 possesses portions forming a groove 134 for containing an annular seal ring 136 surrounding the external surface of pipe 10. A conduit 140 leads from the outer surface of manifold 126 to said groove 134. Hydrostatic fluid under pressure may be transmitted through conduit 140 to cause said annular ring 136 to seat against the external surface of pipe 10.

Similarly, a conduit 142 extends from an external surface of threaded nut 132 to a surface of test pad 130 as shown in FIG. 8. Hydrostatic fluid under pressure may be introduced through conduit 142 to cause said test pad 130 to be urged into tight contact with sealing face surface 18 of pipe 10. O-ring 144 prevents said fluid from escaping between the juncture of threaded nut 132 and manifold 126. O-ring 146 prevents the fluid from escaping between the juncture of test pad 130 and manifold 126. O-ring 148 prevents said fluid from escaping between the juncture of threaded nut 132 and test pad 130.

As shown in FIG. 8, the surfaces of manifold 126, test pad 130, pipe 10 and annular seal ring 136 define a cavity 151 having fluid communication with the juncture between test pad 130 and sealing face surface 18. A test fluid conduit 150 leads from an external surface of manifold 126 to said cavity 151. Hydrostatic test fluid under pressure introduced into cavity 151 will leak between the juncture of test pad 130 and sealing face surface 18 if surface irregularities exist in the surface of sealing face surface 18 as previously described. Said leaking fluid may be detected within the interior of pipe 10 if such leakage occurs.

FIG. 9 discloses yet another embodiment of the invention for testing the sealing face 16 of the male end 12 of a pipe. This embodiment of the invention also has means for externally gripping the pipe 10 being tested. This embodiment of the invention generally comprises a cylindrically symmetrical manifold 152 having portions adapted to receive a cylindrically symmetrical test pad 154, an annular seal 156, a spacer 158 and threaded nut 160, all as shown in FIG. 9.

Specifically, manifold 152 has portions defining a shoulder 162 upon which said spacer 158 may rest. During the assembly of the apparatus of this embodiment of the invention, spacer 158 is placed against shoulder 162 of manifold 152. Then annular seal 156 is placed next to said spacer 158 where it is held in position by threaded nut 160 as shown in FIG. 9. Threaded nut 160 is threadably engageable with a threaded portion of manifold 152 as shown in FIG. 9.

Annular seal 156 may take the form of any of a number of well known means for forming a seal around the external surface of a pipe. The annular seal 156 depicted in FIG. 9 is an annular seal which is the subject of U.S. Letters Pat. No. 4,010,633 issued to Malvern M. Hasha on Mar. 8, 1977.

In operation, the apparatus of this embodiment of the invention is lowered onto and around the male end 12 of the pipe to be tested until a surface of test pad 154 abuts the sealing face surface 16 of the male end 12 of the pipe 10. Then, hydrostatic test fluid is introduced through a conduit 164 leading from an external surface of manifold 152 to a cavity 166 defined by surfaces of manifold 152, annular seal 156, spacer 158 and threaded nut 160. The hydrostatic test fluid in cavity 166 causes annular seal 156 to seat against the external surface of pipe 10. O-rings 168 and 169 prevent the hydrostatic test fluid from escaping through the juncture of threaded nut 160 and manifold 152 and through the juncture between spacer 158 and manifold 152.

Next, hydrostatic fluid is introduced through conduit 170 leading from an external surface of manifold 152 to a surface of test pad 154 as shown in FIG. 9. When said hydrostatic fluid is subjected to high levels of hydrostatic pressure, said test pad 154 is urged into tight contact with sealing face surface 16 of the male end 12 of pipe 10. O-rings 178 and 179 prevent the escape of said fluid through the juncture of test pad 154 and manifold 152.

At this point, hydrostatic fluid is introduced under high pressure through conduit 172 leading from an external surface of manifold 152 to a cavity 174 defined by the surfaces of manifold 152, test pad 154, spacer 158, annular seal 156 and pipe 10. When said hydrostatic test fluid is under high levels of hydrostatic pressure, said hydrostatic test fluid may leak through the juncture between sealing face surface 16 and test pad 154 if surface irregularities exist and sealing face surface 16. Any hydrostatic test fluid leaking through the juncture between sealing face surface 16 and test pad 154 may be detected within space 176 between test pad 154 and the male end 12 of pipe 10.

It should be noted that in each of the foregoing embodiments of the invention, water is the most convenient and practical fluid to use in practicing the invention, both as a test fluid and as a fluid for transmitting force to urge the test pad into tight contact with the sealing face surface. Accordingly, the term "hydrostatic" has been chosen to describe the nature of the testing process. However, since clearly any fluid may be used, including numerous liquids and gases, the term "hydrostatic" shall be taken to refer to any fluid and shall not be limited to denoting the use of water as the operating fluid.

Although a number of preferred embodiments of the invention have been described it is to be understood that modifications may be made in the disclosed preferred embodiments without departing from the true spirit and scope of the invention.

What is claimed is:

1. An apparatus for testing a sealing face surface of a pipe comprising
    means for engaging a test pad against said sealing face surface of said pipe; and
    means for applying pressure to the juncture between said test pad and said sealing face surface to test said sealing face surface of said pipe for seal integrity against leakage, and
    wherein the sealing face surface of the pipe, in the case of a male end of a threaded pipe, is the shoulder at the end of the threaded portion, and in the case of a female end of such threaded pipe, is the extreme end edge, and in the case of an unthreaded pipe, is the extreme end edge thereof.

2. An apparatus for testing a sealing face surface of a pipe, comprising
    means for engaging a test pad against said sealing face surface of said pipe;
    means for effecting tight contact between said test pad and said sealing face surface; and
    means for applying pressure to the juncture between said test pad and said sealing face surface to test said sealing face surface of said pipe for seal integrity against leakage, and
    wherein the sealing face surface of the pipe, in the case of a male end of a threaded pipe, is the shoulder at the end of the threaded portion, and in the case of a female end of such threaded pipe, is the extreme end edge, and in the case of an unthreaded pipe, is the extreme end edge thereof.

3. An apparatus for hydrostatically testing a sealing face surface of a pipe comprising
    means for engaging a test pad against said sealing face surface of said pipe;
    means for effecting tight contact between said test pad and said sealing face surface; and
    means for applying fluid under pressure to the juncture between said test pad and said sealing face surface to test said sealing face surface of said pipe for seal integrity against leakage, and
    wherein the sealing face surface of the pipe, in the case of a male end of a threaded pipe, is the shoulder at the end of the threaded portion, and in the case of a female end of such threaded pipe, is the extreme end edge, and in the case of an unthreaded pipe, is the extreme end edge thereof.

4. An apparatus for hydrostatically testing a sealing face surface of a pipe comprising
    means for engaging a test pad against said sealing face surface of said pipe;
    means for applying force to said test pad to effect tight contact between said test paid and said sealing face surface; and
    means for applying fluid under pressure to the juncture between said test pad and said sealing face surface to test said sealing face surface of said pipe for seal integrity against leakage, and
    wherein the sealing face surface of the pipe, in the case of a male end of a threaded pipe, is the shoulder at the end of the threaded portion, and in the case of a female end of such threaded pipe, is the extreme end edge, and in the case of an unthreaded pipe, is the extreme end edge thereof.

5. An apparatus for hydrostatically testing a sealing face surface of a pipe comprising
    a manifold connectible to said pipe;
    a force applying member associated with said manifold;
    a test pad engagable with said sealing face surface of said pipe, said force applying member co-acting with said test pad when said manifold is connected to said pipe to apply force to engage said test pad with said sealing face surface;
    means for applying force to said force-applying member to effect tight contact between said test pad and said sealing face surface; and
    means for applying fluid under pressure to the juncture between said test pad and said sealing face surface to test said sealing face surface of said pipe for seal integrity against leakage, and
    wherein the sealing face surface of the pipe, in the case of a male end of a threaded pipe, is the shoulder at the end of the threaded portion, and in the case of a female end of such threaded pipe, is the extreme end edge, and in the case of an unthreaded pipe, is the extreme end edge thereof.

6. An apparatus as claimed in claim 5 wherein said means for applying force to said force-applying member to effect tight contact between said test pad and said sealing face surface comprises
    means extending through said manifold for conducting fluid under pressure to a surface of said force-applying member to cause said force-applying member to press said test pad against said sealing face surface.

7. An apparatus as claimed in claim 5 wherein said means for applying fluid under pressure to the juncture between said test pad and said sealing face surface comprises
    a cavity formed by the surfaces of said manifold, said force-applying member and said test pad with respect to said pipe when said manifold is connected to said pipe, said cavity permitting fluid communication with the juncture between said test pad and said sealing face surface; and
    means extending from the exterior of said pipe to said cavity for conducting fluid under pressure to said cavity.

8. An apparatus as claimed in claim 7 together with means for preventing the escape of said fluid from said cavity other than by escaping through the juncture between said test pad and said sealing face surface.

9. An apparatus for hydrostatically testing the sealing face surface of the female end portion of a threaded pipe comprising
    a threaded manifold for threadably engaging the female end portion of said threaded pipe, said threaded manifold having an axial passageway therethrough;
    a test pad having a surface area covering the cross-sectional area of the threaded pipe, said test pad having an axial passageway therethrough;
    a rod slidably disposed within the axial passageways of said test pad and said threaded manifold;

a first flange on a first end of said rod for retaining said test pad on said rod and for securing said test pad against the sealing face surface of the female end portion of the threaded pipe;

means for biasing said rod with respect to said threaded manifold while said rod is slidably disposed within said threaded manifold and while said threaded manifold is threadably engaged within the female end portion of said threaded pipe to cause said first flange of said rod to press said test pad against the sealing face surface of the female end portion of the threaded pipe; and means for applying fluid under pressure to the juncture between said test pad and said sealing face surface of the female end portion of the threaded pipe to test said sealing face surface of the female end portion of said threaded pipe for seal integrity against leakage.

10. An apparatus as claimed in claim 9 wherein said means for applying fluid under pressure to the juncture between said test pad and said sealing face surface of the female end portion of the threaded pipe comprises a cavity formed by the surfaces of said threaded manifold and said test pad with respect to said pipe when said threaded manifold engages said pipe, said cavity permitting fluid communication with the juncture between said test pad and said sealing face surface; and means extending from the exterior of said pipe to said cavity for conducting fluid under pressure to said cavity.

11. An apparatus as claimed in claim 10 together with means for preventing the escape of said fluid from said cavity other than by escaping through the juncture between said test pad and said sealing face surface.

12. An apparatus for hydrostatically testing the sealing face surface of the female end portion of a threaded pipe comprising a threaded manifold for threadably engaging the female end portion of said threaded pipe, said threaded manifold having an axial passageway therethrough and having portions defining a recessed area in the surface of said threaded manifold that faces the interior of said threaded pipe when said threaded manifold is threadably engaged within said threaded pipe;

a test pad having a surface area covering the cross-sectional area of the threaded pipe, said test pad having an axial passageway therethrough;

a rod having an axial passageway through a portion of the rod and having at least one radial port connecting said axial passageway with the exterior surface of said rod, said rod being slidably disposed within the axial passageways of said test pad and said threaded manifold;

a first flange on a first end of said rod for retaining said test pad on said rod and for securing said test pad against the sealing face surface of the female end portion of the threaded pipe;

a piston which snugly fits into the aforesaid recessed area of said threaded manifold to form a chamber between the surface of the recessed area of said threaded manifold and the surface of said piston, said chamber being open to receive fluid from at least one of the aforementioned radial ports of said rod, said piston having an axial passageway therethrough for receiving a second end of said rod extending through said threaded manifold;

means for retaining said piston on said second end of said rod;

means for containing fluid under pressure within said chamber and within said axial passageway of said rod and within said radial ports of said rod to cause said rod to be biased with respect to said threaded manifold while said rod is slidably disposed within said threaded manifold and while said threaded manifold is threadably engaged within the female end portion of said threaded pipe to cause said first flange of said rod to press said test pad against the sealing face surface of the female end portion of the threaded pipe; and means for applying fluid under pressure to the juncture between said test pad and said sealing face surface of the female end portion of the threaded pipe to test said sealing face surface of the female end portion of said threaded pipe for seal integrity against leakage.

13. An apparatus as claimed in claim 12 wherein said means for applying fluid under pressure to the juncture between said test pad and said sealing face surface of the female end portion of the threaded pipe comprises a cavity formed by the surfaces of said threaded manifold and said test pad with respect to said pipe when said threaded manifold engages said pipe, said cavity permitting fluid communication with the juncture between said test pad and said sealing face surface; and means extending from the exterior of said pipe to said cavity for conducting fluid under pressure to said cavity.

14. An apparatus as claimed in claim 13 together with means for preventing the escape of said fluid from said cavity other than by escaping through the juncture between said test pad and said sealing face surface.

15. An apparatus for hydrostatically testing the sealing face surface of the female end portion of a threaded pipe comprising a threaded manifold for threadably engaging the female end portion of said threaded pipe, said threaded manifold having an axial passageway therethrough and having portions defining a first recessed area in the surface of said threaded manifold that faces the exterior of said threaded pipe when said threaded manifold is threadably engaged within said threaded pipe;

a test pad having a surface area covering the cross-sectional area of the threaded pipe, said test pad having an axial passageway therethrough and having portions extending inwardly with respect to said threaded pipe forming a test pad plug complementary in shape to and fitting at close tolerance within said first recessed area of said threaded manifold when said test pad abuts said sealing face surface of the female end portion of said threaded pipe;

a rod slidably disposed within the axial passageways of said test pad and said threaded manifold;

a first flange on a first end of said rod for retaining said test pad on said rod and for securing said test pad against the sealing face surface of the female end portion of the threaded pipe;

means for biasing said rod with respect to said threaded manifold while said rod is slidably disposed within said threaded manifold and while said threaded manifold is threadably engaged within the female end portion of said threaded pipe to cause said first flange of said rod to press said test pad against the sealing face surface of the female end portion of the threaded pipe; and means for applying fluid under pressure to the juncture between said test pad and said sealing face surface of the female end portion of the threaded pipe to test said sealing face surface of the female end portion of said threaded pipe for seal integrity against leakage.

16. An apparatus as claimed in claim 15 wherein said means for applying fluid under pressure to the juncture between said test pad and said sealing face surface of the female end portion of the threaded pipe comprises a cavity formed by the surfaces of said threaded manifold and said test pad with respect to said pipe when said threaded manifold engages said pipe, said cavity permitting fluid communication with the juncture between said test pad and said sealing face surface; and means extending from the exterior of said pipe to said cavity for conducting fluid under pressure to said cavity.

17. An apparatus as claimed in claim 16 together with means for preventing the escape of said fluid from said cavity other than by escaping through the juncture between said test pad and said sealing face surface.

18. An apparatus for hydrostatically testing the sealing face surface of the female end portion of a threaded pipe comprising a threaded manifold for threadably engaging the female end portion of said threaded pipe, said threaded manifold having an axial passageway therethrough and having portions defining a first recessed area in the surface of said threaded manifold that faces the exterior of said threaded pipe when said threaded manifold is threadably engaged within said threaded pipe and having portions defining a second recessed area in the surface of said threaded manifold that faces the interior of said threaded pipe when said threaded manifold is threadably engaged within said threaded pipe;

a test pad having a surface area covering the cross-sectional area of the threaded pipe, said test pad having an axial passageway therethrough and having portions extending inwardly with respect to said threaded pipe forming a test pad plug complementary in shape to and fitting at close tolerance within said first recessed area of said threaded manifold when said test pad abuts said sealing face surface of the female end portion of said threaded pipe;

a rod having an axial passageway through a portion of the rod and having at least one radial port connecting said axial passageway with the exterior surface of said rod, said rod being slidably disposed within the axial passageways of said test pad and said threaded manifold;

a first flange on a first end of said rod for retaining said test pad on said rod and for securing said test pad against the sealing face surface of the female end portion of the threaded pipe;

a piston which snugly fits into the aforesaid second recessed area of said threaded manifold to form a chamber between the surface of said second recessed area of said threaded manifold and the surface of said piston, said chamber being open to receive fluid from at least one of the aforementioned radial ports of said rod, said piston having an axial passageway therethrough for receiving a second end of said rod extending through said threaded manifold;

means for retaining said piston on said second end of said rod;

means for containing fluid under pressure within said chamber and within said axial passageway of said rod and within said radial ports of said rod to cause said rod to be biased with respect to said threaded manifold while said rod is slidably disposed within said threaded manifold and while said threaded manifold is threadably engaged within the female end portion of said threaded pipe to cause said first flange of said rod to press said test pad against the sealing face surface of the female end portion of the threaded pipe; and means for applying fluid under pressure to the juncture between said test pad and said sealing face surface of the female end portion of the threaded pipe to test said sealing face surface of the female end portion of said threaded pipe for seal integrity against leakage.

19. An apparatus as claimed in claim 18 wherein said means for applying fluid under pressure to the juncture between said test pad and said sealing face surface of the female end portion of the threaded pipe comprises a cavity formed by the surfaces of said threaded manifold and said test pad with respect to said pipe when said threaded manifold engages said pipe, said cavity permitting fluid communication with the juncture between said test pad and said sealing face surface; and means extending from the exterior of said pipe to said cavity for conducting fluid under pressure to said cavity.

20. An apparatus as claimed in claim 19 together with means for preventing the escape of said fluid from said cavity other than by escaping through the juncture between said test pad and said sealing face surface.

21. An apparatus for hydrostatically testing the sealing face surface of the male end portion of a threaded pipe comprising a threaded manifold for threadably engaging the male end portion of said threaded pipe;

a pressure collar associated with said threaded manifold;

a test pad engageable with said sealing face surface of said pipe, said pressure collar coacting with said test pad when said threaded manifold is threadably engaged on said male end portion of said threaded pipe to apply force to engage said test pad with said sealing face surface;

means for applying force to said test pad to effect tight contact between said test pad and said sealing face surface; and means for applying fluid under pressure to the juncture between said test pad and said sealing face surface of the male end portion of the threaded pipe to test said sealing face surface of the male end portion of said threaded pipe for seal integrity against leakage.

22. An apparatus as claimed in claim 21 wherein said means for applying force to said test pad to effect tight contact between said test pad and said sealing face surface comprises means extending through said threaded manifold for conducting fluid under pressure to a surface of said pressure collar to cause said pressure collar to press said test pad against said sealing face surface.

23. An apparatus as claimed in claim 21 wherein said means for applying fluid under pressure to the juncture between said test pad and said sealing face surface of the male end portion of the threaded pipe comprises a cavity formed by the surfaces of said threaded manifold, said pressure collar and said test pad with respect to said pipe when said threaded manifold engages said pipe, said cavity permitting fluid communications with the juncture between said test pad and said sealing face surface; and means extending from the exterior of said pipe to said cavity for conducting fluid under pressure to said cavity.

24. An apparatus as claimed in claim 23 together with means for preventing the escape of said fluid from said cavity other than by escaping through the juncture between said test pad and said sealing face surface.

25. An apparatus for hydrostatically testing the sealing face surface of the male end portion of a threaded pipe comprising a test pad in the form of an annulus having an inner radius with a greater dimension than the outer radius of the portion of the male end of a threaded pipe immediately adjacent to the sealing face surface of said pipe, said test pipe having a flat bottom surface for seating against said sealing face surface and having a threaded top portion;

a cylindrically symmetrical pressure collar having a threaded bottom portion designed to threadably engage the threaded top portion of said test pad and having a top portion with a cylindrically symmetrical shoulder and a cylindrically symmetrical wall;

a cylindrically symmetrical manifold for threadably engaging the male end portion of a threaded pipe, said manifold having a bottom portion fitting over said top portion of said pressure collar when said manifold is completely threaded onto said threaded pipe;

means extending through said manifold for conducting fluid under pressure to a surface of said pressure collar to cause said pressure collar to press said test pad against said sealing face surface; and means for applying fluid under pressure to the juncture between said test pad and said sealing face surface of the male end portion of the threaded pipe to test said sealing face surface of the male end portion of said threaded pipe for seal integrity against leakage.

26. An apparatus as claimed in claim 25 wherein said means for applying fluid under pressure to the juncture between said test pad and said sealing face surface of the male end portion of said threaded pipe comprises a cavity formed by the surface of said threaded manifold, said pressure collar and said test pad with respect to said pipe when said threaded manifold engages said pipe, said cavity permitting fluid communication with the juncture between said test pad and said sealing face surface; and means extending from the exterior of said pipe to said cavity for conducting fluid under pressure to said cavity.

27. An apparatus as claimed in claim 26 together with means for preventing the escape of said fluid from said cavity other than by escaping through the juncture between said test pad and said sealing face surface.

28. An apparatus for hydrostatically testing the sealing face surface of the female end portion of a threaded pipe comprising a threaded manifold for threadably engaging the female end portion of said threaded pipe, said threaded manifold having portions defining a test pad having a surface area covering the cross sectional area of the threaded pipe;

means detachably mountable on an external surface of said pipe for rotating said threaded manifold into threaded engagement with the threads of said pipe, and means for applying fluid under pressure to the juncture between said test pad portions of said threaded manifold and said sealing face surface of the female end portion of said threaded pipe, said sealing face surface comprising the extreme end surface of said female end, when said test pad portions of said threaded manifold abut said sealing face surface of the female end portion of said threaded pipe to test the sealing face surface of the female end of said threaded pipe for seal integrity against leakage.

29. An apparatus for hydrostatically testing the sealing face surface of the female end portion of a threaded pipe comprising a threaded manifold for threadably engaging the female end portion of said threaded pipe, said threaded manifold having an axial passageway partially therethrough and having portions defining a test pad having a surface area covering the cross-sectional area of the threaded pipe;

a sprocket rotationally coupled to said threaded manifold and having an axial passageway therethrough;

a frame detachably mountable on an external surface of said pipe having an axial passageway therethrough;

a rod slidably disposed within the axial passageways of said threaded manifold, said sprocket and said frame;

a flange on an end of said rod for securing said rod with respect to said frame;

means for rotating said sprocket to cause said threaded manifold to rotate into threaded engagement with the threads of said pipe; and means for applying fluid under pressure to the juncture between said test pad portions of said threaded manifold and said sealing face surface of the female end portion of said threaded pipe when said test pad portions of said threaded manifold abut said sealing face surface of the female end portion of said threaded pipe to test said sealing face surface of the female end portion of said threaded pipe for seal integrity against leakage.

30. An apparatus as claimed in claim 29 wherein said frame detachably mountable on said pipe comprises a cylindrically symmetrical frame base having a plurality of frame arms disposed around the periphery of said frame base;

a tong pivotally mounted on the end of each of said plurality of frame arms for gripping the exterior surface of said pipe;

a roller mounted on each of said plurality of frame arms, said roller being in slidable communication with an external surface of said test pad portions of said threaded manifold, said roller coacting with said external surface of said test pad portions of said threaded manifold to cause said frame to rotate with respect to said pipe when said threaded manifold is threaded into said pipe, to cause said tongs mounted on said frame arms to grip the external surface of said pipe.

31. An apparatus as claimed in claim 29 or claim 30 wherein said means for applying fluid under pressure to the juncture between said test pad portions of said threaded manifold and said sealing face surface of the female end portion of said threaded pipe comprises a cavity formed by the surfaces of said threaded manifold with respect to said pipe when said threaded manifold threadably engages said pipe, said cavity permitting fluid communication with the juncture between said test pad portions of said threaded manifold and said sealing face surface; and means extending from the exterior of said pipe to said cavity for conducting fluid under pressure to said cavity.

32. An apparatus as claimed in claim 31 together with means for preventing the escape of said fluid from said cavity other than by escaping through the juncture between said test pad and said sealing face surface.

33. An apparatus for hydrostatically testing the sealing face surface of a pipe comprising a manifold having an inner diameter only slightly larger than the outer diameter of said pipe and having portions for receiving pivotally mounted gripping cams for gripping the external surface of said pipe and having threaded portions for receiving a threaded nut;

pivotally mounted gripping cams mounted within said manifold for gripping the external surface of said pipe;

a test pad having a surface area covering the surface area of the sealing face surface of said pipe;

a threaded nut threadably engageable within said threaded portions of said manifold for urging said test pad into tight contact with said sealing face surface of said pipe;

an annular seal ring within a groove of said manifold for surrounding the external surface of said pipe;

means extending through said threaded nut for conducting fluid under pressure to a surface of said test pad to cause said test pad to press against said sealing face surface; and means for applying fluid under pressure to the juncture between said test pad and said sealing face surface of said pipe to test said sealing face surface of said pipe for seal integrity against leakage.

34. An apparatus as claimed in claim 33 wherein said means for applying fluid under pressure to the juncture between said test pad and said sealing face surface of said pipe comprises a cavity formed by the surfaces of said manifold, said test pad and said annular seal ring with respect to said pipe, said cavity permitting fluid communication with the juncture between said test pad and said sealing face surface; and means extending from the exterior of said manifold to said cavity for conducting fluid under pressure to said cavity.

35. An apparatus as claimed in claim 34 together with means for preventing the escape of said fluid from said cavity other than by escaping through the juncture between said test pad and said sealing face surface.

36. An apparatus for hydrostatically testing the sealing face surface of the male end portion of a threaded pipe comprising a manifold for engaging an external surface of said male end portion of said threaded pipe, said manifold having portions adapted to receive a test pad;

a test pad within said manifold having a surface for abutting said sealing face surface of the male end portion of said pipe;

an annular seal for forming a seal around the external surface of said pipe;

a spacer and threaded nut disposed within said manifold for holding said annular seal in position against said external surface of said pipe;

means extending through said manifold for conducting fluid under pressure to a surface of said test pad to cause said test pad to press against said sealing face surface; and means for applying fluid under pressure to the juncture between said test pad and said sealing face surface of the male end portion of the threaded pipe to test said sealing face surface of the male end portion of said threaded pipe for seal integrity against leakage.

37. An apparatus as claimed in claim 36 wherein said means for applying fluid under pressure to the juncture between said test pad and said sealing face surface of the male end portion of said threaded pipe comprises a cavity formed by the surfaces of said manifold, said test pad, said spacer and said annular seal with respect to said pipe when said apparatus engages the external surface of said pipe, said cavity permitting fluid communication with the juncture between said test pad and said sealing face surface; and means extending from the exterior of said manifold to said cavity for conducting fluid under pressure to said cavity.

38. An apparatus as claimed in claim 37 together with means for preventing the escape of said fluid from said cavity other than by escaping through the juncture between said test pad and said sealing face surface.

39. A method for testing the sealing face surface of a pipe comprising engaging a test pad against a sealing face surface of a pipe;

effecting tight contact between said test pad and said sealing face surface;

applying pressure to the juncture between said test pad and said sealing face surface of said pipe; and inspecting the juncture between said test pad and said sealing face surface to determine the seal integrity against leakage of said sealing face surface of said pipe, and wherein the sealing face surface of the pipe, in the case of a male end of a threaded pipe, is the shoulder at the end of the threaded portion, and in the case of a female end of such threaded pipe, is the extreme end edge, and in the case of an unthreaded pipe, is the extreme end edge thereof.

40. A method for hydrostatically testing the sealing face surface of a pipe comprising engaging a test pad against a sealing face surface of a pipe;

applying force to said test pad to effect tight contact between said test pad and said sealing face surface;

applying fluid under pressure of the juncture between said test pad and said sealing face surface; and inspecting the juncture between said test pad and said sealing face surface on the side of the juncture opposite the side of the juncture to which said fluid is applied to detect leaking fluid to determine the seal integrity against leakage of said sealing face surface of said pipe, and wherein the sealing face surface of the pipe, in the case of a male end of a threaded pipe, is the shoulder at the end of the threaded portion, and in the case of a female end of such threaded pipe, is the extreme end edge, and in the case of an unthreaded pipe, is the extreme end edge thereof.

* * * * *